US012191595B2

(12) United States Patent
Schlegel et al.

(10) Patent No.: US 12,191,595 B2
(45) Date of Patent: Jan. 7, 2025

(54) MODULARIZABLE PLUG CONNECTOR MODULE FOR A HEAVY-DUTY INDUSTRIAL PLUG CONNECTOR

(71) Applicant: HARTING ELECTRIC GMBH & CO. KG, Espelkamp (DE)

(72) Inventors: Bernard Schlegel, Espelkamp (DE); Heiko Meier, Espelkamp (DE); Irina Lötkemann, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 397 days.

(21) Appl. No.: 17/627,560

(22) PCT Filed: Jul. 10, 2020

(86) PCT No.: PCT/DE2020/100604

§ 371 (c)(1),
(2) Date: Jan. 14, 2022

(87) PCT Pub. No.: WO2021/008655

PCT Pub. Date: Jan. 21, 2021

(65) Prior Publication Data

US 2022/0320785 A1 Oct. 6, 2022

(30) Foreign Application Priority Data

Jul. 17, 2019 (DE) ..................... 10 2019 119 379.6

(51) Int. Cl.
*H01R 13/514* (2006.01)
*H01R 13/502* (2006.01)
*H01R 43/20* (2006.01)

(52) U.S. Cl.
CPC ......... *H01R 13/514* (2013.01); *H01R 13/502* (2013.01); *H01R 43/20* (2013.01)

(58) Field of Classification Search
CPC .... H01R 13/514; H01R 13/502; H01R 43/20; H01R 9/2408
(Continued)

(56) References Cited

U.S. PATENT DOCUMENTS 6,004,162 A 12/1999 Harting et al.
6,176,741 B1 1/2001 Shutter
(Continued)

FOREIGN PATENT DOCUMENTS

CN 1191400 A 8/1998
CN 201417871 Y * 3/2010
(Continued)

OTHER PUBLICATIONS

European Patent Office, International Search Report and Written Opinion for international application No. PCT/DE2020/100604, mailed Sep. 24, 2020, 13 pages (with English translation of International Search Report).
(Continued)

*Primary Examiner* — Peter G Leigh
(74) *Attorney, Agent, or Firm* — Seed IP Law Group LLP

(57) ABSTRACT

A plug connector module for a modular industrial plug connector is provided, wherein the plug connector module is formed from at least two independent functional units, wherein the functional units enclose a cavity when in the assembled state together. A method for producing a plug connector module for a modular industrial plug connector is also provided, comprising: initially assembling at least two independent functional units, wherein the functional units enclose a cavity when in the assembled state together; and subsequently at least partially filling the cavity with a fixing material, whereby the functional units are fixed to one another.

9 Claims, 4 Drawing Sheets

(58) Field of Classification Search
USPC .......................................................... 439/724
See application file for complete search history.

(56) References Cited

U.S. PATENT DOCUMENTS

| | | | | |
|---|---|---|---|---|
| 6,322,398 | B1 | 11/2001 | Fladung | |
| 7,316,582 | B2 * | 1/2008 | Fan | H01R 13/514 439/540.1 |
| 2006/0030222 | A1 * | 2/2006 | Fan | H01R 13/514 439/684 |
| 2006/0110978 | A1 * | 5/2006 | Fan | H01R 13/514 439/607.01 |
| 2017/0117655 | A1 * | 4/2017 | Meier | H01R 9/2608 |
| 2019/0140388 | A1 | 5/2019 | Mossig et al. | |
| 2019/0237913 | A1 | 8/2019 | Nass et al. | |
| 2021/0265766 | A1 | 8/2021 | Kliever et al. | |
| 2021/0273370 | A1 | 9/2021 | Lötkemann et al. | |

FOREIGN PATENT DOCUMENTS

| | | | | |
|---|---|---|---|---|
| CN | 105637711 | A | 6/2016 | |
| CN | 109716597 | A | 5/2019 | |
| CN | 109755798 | A | 5/2019 | |
| DE | 10 2014 108 847 | A1 | 12/2015 | |
| DE | 102017123331 | B3 * | 3/2019 | H01R 13/20 |
| DE | 10 2018 115 371 | A1 | 1/2020 | |
| FR | 2496192 | A1 * | 6/1982 | H01R 13/514 |
| FR | 2781312 | A3 * | 1/2000 | H01R 13/518 |
| WO | WO-2012107387 | A1 * | 8/2012 | H01R 13/514 |
| WO | WO-2020001688 | A1 * | 1/2020 | H01R 13/514 |

OTHER PUBLICATIONS

German Patent Office, Office Action for German application No. 10 2019 119 379.6 dated May 13, 2020, 6 pages.

* cited by examiner

MODULARIZABLE PLUG CONNECTOR MODULE FOR A HEAVY-DUTY INDUSTRIAL PLUG CONNECTOR

BACKGROUND

Technical Field

This disclosure relates to a connector module for a heavy-duty industrial connector, and further relates to a method for producing such a connector module.

Such connector modules are required as part of a modular connector system in order to be able to flexibly adapt a connector, in particular a heavy-duty industrial connector, to specific requirements regarding signal and power transmission, for example, between two electrical devices. Usually, for this purpose, connector modules are inserted into corresponding holding frames, which are sometimes also referred to as hinged frames, module frames or modular frames. The holding frames are thus used to hold a plurality of connector modules that are similar to each other and/or also different from each other and to securely fasten them to a surface and/or a device wall and/or in a connector housing or the like.

DESCRIPTION OF THE RELATED ART

Connector modules for heavy-duty industrial connectors generally each have a substantially cuboid insulating body or a cuboid housing. These insulating bodies or housings can, for example, serve as contact carriers and accommodate and fix contacts of a very wide range of types. The function of a connector formed by this means is thus very flexible. For example, pneumatic modules, optical modules, modules for transmitting electrical energy and/or electrical analog and/or digital signals can be accommodated in the particular insulating body or housing and can thus find use in the modular connector system. Increasingly, connector modules are also taking on measurement- and data-related tasks.

Optimally, holding frames are used that are formed from two frame halves that are hinged together. The connector modules are provided with approximately rectangular holding means or devices, such as lugs, projecting from the narrow sides of the connector modules. Recesses or openings designed as openings closed on all sides are provided in the side parts of the frame halves, into which recesses or openings the holding means or devices are received when the connector modules are inserted into the holding frame. So-called hinged frames are used most frequently. To insert the connector modules, the holding frame is unfolded, i.e., opened, wherein the frame halves around the joints are unfolded only far enough to allow the connector modules to be inserted. The frame halves are then folded together, i.e., the holding frame is closed, wherein the holding means or devices (e.g., lugs) enter the recesses and a secure, form-fitting hold of the connector modules in the holding frame is produced.

The modular industrial connectors described above offer a high degree of flexibility and can be configured for a very wide range of applications by installing connector modules with different functions together in a common holding frame. However, the number of connector module slots in a holding frame is limited. This places limits on the flexibility of such an industrial connector.

Ideas to increase the flexibility of such an industrial connector with connector modules, which in turn are composed in a modular fashion from different functional units, are contrary to customer wishes, namely for less effort to be required for the assembly of an industrial connector.

The German Patent and Trade Mark Office has searched the following prior art in the priority application for the present application: DE 10 2017 123 331 B3, DE 10 2014 108 847 A1 and DE 10 2018 115 371 A1.

BRIEF SUMMARY

According to embodiments of the invention, a connector module is provided that enables a modular industrial connector having increased modularity without simultaneously increasing the assembly effort for such a connector.

The connector module according to embodiments of the invention is intended for use in a modular industrial connector. Here, a plurality of connector modules of the same type and/or different types are generally installed in a so-called holding frame. The holding frame is then installed in a connector housing or a device wall. The connector module according to embodiments of the invention is formed from at least two independent functional units.

A functional unit forms an independent component. This means that the functional unit can function independently, i.e., without another functional unit connected to it. A functional unit does not become technically usable only when two or more functional units are joined together to form a connector module.

Preferably, a functional unit comprises at least one contact element and/or one sensor and/or one edge computer. The edge computer can, for example, collect, store, process and send data. The contact element can, for example, be an electrical contact element for current or signal transmission. The contact element can also be an optical contact element to which, for example, an optical fiber is connected. A functional unit can have a plurality of contact elements, in particular also a plurality of different contact elements. For example, electrical and optical contact elements can be mixed together. The sensor can, for example, be a current sensor that monitors an adjacent contact element, for example arranged in an adjacent functional unit. However, temperature sensors, optical sensors, in particular scattered light sensors or other sensors can also be provided. A functional unit can also contain a plurality of sensors, in particular also different sensors. A functional unit can also contain one sensor or a plurality of sensors and simultaneously one contact element or a plurality of contact elements.

The functional units of a connector module can act completely independently of each other. However, it is also possible that the functional units experience a synergistic effect as a result of being joined together, especially when sensors of one functional unit are combined with contact elements of another functional unit.

In the assembled state, the functional units enclose a cavity with each other. The term "cavity" in this context means a hollow space that is accessible from the outside. For this purpose, each functional unit has a curvature which forms the mentioned hollow space or the mentioned cavity when the functional units are assembled.

The cavity can also have two openings to the outside. This allows, for example, a separate fixing means or devices to be introduced on both sides.

The cavity can extend substantially in the mating direction and/or perpendicular to the mating direction of the connector module. The mating direction here is the direction in which the connector module is guided to a mating connector module during the mating process. Such an orientation of the cavity allows it to be easily filled with a fixing means or device, or the fixing means or device can be easily introduced into the cavity.

By at least partially filling the cavity with the fixing means or device, the functional units are fixed to each other. The fixing means or device is in particular a separate component. The fixing of the functional units to one another can be reversible if the fixing means or device is designed in such a way that it can be removed from the cavity again. In this case, the functional units can be reused and combined differently accordingly. For example, a defective functional unit can be replaced in this way without having to dispose of the still functioning functional unit previously combined with it. Such a solution is particularly sustainable.

The fixing means or device can be an already existing, separate component. The fixing means or device, according to one aspect, has the form of a component insertable into the space. Such a component can be easily created, for example in an injection molding process.

However, the fixing means or device can also be created during an injection molding process during fixing of the functional units together. In this case, the functional units are first brought together. The resulting cavity is filled with a plastic material in a plastic injection molding process, which cures and in so doing creates or forms the fixing means or device. Partial filling of the cavity can be sufficient.

The initially still liquid fixing means or device can be injected into one access opening of the cavity and, if necessary, excess material can then escape through a second opening of the cavity. Two openings would then also accelerate the curing process accordingly.

Preferably, the fixing means or device has a cross-shaped cross section. Two of the cross bars can each be anchored in a functional unit, resulting in a particularly stable and play-free connection of the functional units. The absence of play in the connection of the functional units is particularly important. Too much play between the functional units results in a "wobbly" connector module and ultimately reduces the functionality of an industrial connector equipped therewith.

Advantageously, the functional units may each have a complementary offset on the sides on which they are brought together. This allows the functional units to be joined together interlockingly. The offset ensures that the functional units are held together in or against the mating direction, even without fixing means or devices. This gives the connector module greater stability, particularly during the mating process.

The production process of a connector module according to an embodiment of the invention is described below. The process steps mentioned here can be permuted where useful to do so.

First, at least two independent functional units are assembled or brought together. In the assembled state, the functional units enclose a cavity with each other.

The cavity is then at least partially filled with a fixing means or device, which fixes the functional units together. An already finished fixing means or device can be introduced into the cavity or pushed into it. Alternatively, the cavity can be filled with a curing compound, for example in an injection molding process. The cured compound then forms the fixing means or device.

In a particularly advantageous embodiment of the invention, holding means or devices, such as lugs, for fixing the connector module in a holding frame, may be integrally formed on narrow sides of the connector module, or a portion of said holding means or devices may be finished. This process step can be carried out before, after or during cavity filling with the fixing means or device.

It is known that connector modules have holding means or devices (e.g., lugs) of different sizes on their narrow sides. This ensures polarization (correct insertion in the intended orientation) of the connector modules in the holding frame, which for this purpose has matching recesses of different sizes. As a result of the above-mentioned subsequent integral forming of the holding means or devices, the functional units can be combined with each other even more flexibly, since it is not necessary to pay attention to the polarization direction in advance.

BRIEF DESCRIPTION OF THE SEVERAL VIEWS OF THE DRAWINGS

Exemplary embodiments of the invention are shown in the drawings and are explained in more detail below.

The figures may contain partially simplified, schematic illustrations. In part, identical reference signs are used for like, but possibly not identical elements. Different views of like elements might be scaled differently.

DETAILED DESCRIPTION

Figure 1:
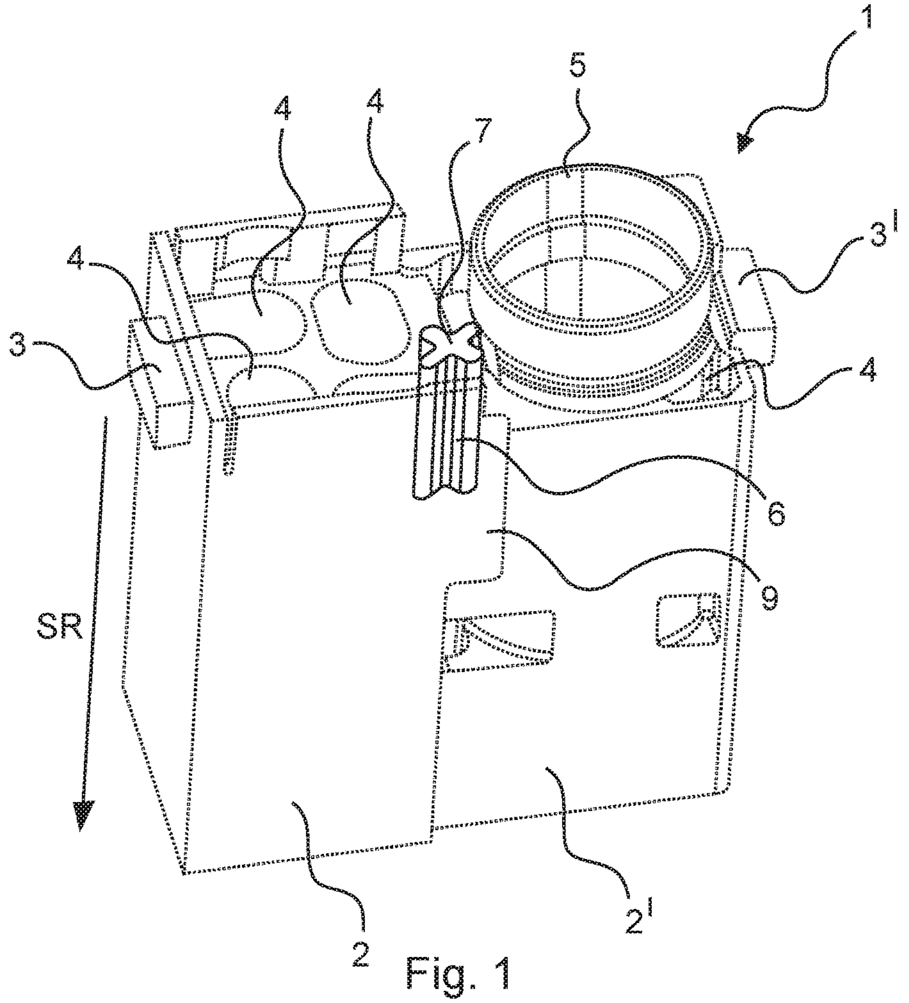
FIG. 1 shows a perspective and partially transparent illustration of a first exemplary embodiment of a connector module according to the invention.

FIG. 1 shows a perspective and partially transparent illustration of a first exemplary embodiment of a connector module 1 according to the invention.

The connector module 1 consists of or comprises two functionally independent functional units 2, 2'. On narrow sides of the connector module 1 formed by the functional units 2, 2', the functional units 2, 2' each have holding means or devices 3, 3' of different size, with which the connector module 1 is fastened in a holding frame (not shown) of an industrial connector (not shown). The functional units 2, 2' have openings 4 in which (different) contact elements 5 can be inserted. However, other elements, such as sensors, can also be provided in the functional units 2, 2'. Since the functionality of the functional units 2, 2' in this respect is not important for the present invention, this will not be discussed in detail below. The connector modules 1 are plugged together in the mating direction SR with a corresponding mating connector module (not shown).

Figure 2:
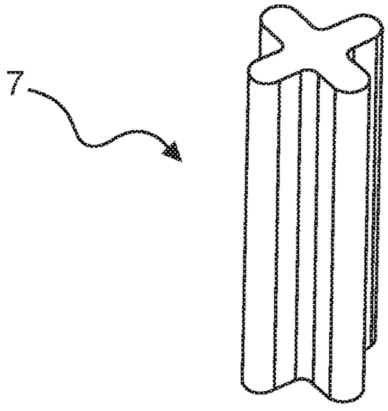
FIG. 2 shows a perspective illustration of a fixing means or device.

The functional units 2, 2' brought together enclose a cavity 6 with each other. The cavity 6 is filled with a fixing means or device 7, which is shown separately in FIG. 2. The fixing means or device 7 has the shape of a cross extruded or insertable into the space.

In the first exemplary embodiment of the connector module (FIG. 1), the functional units 2, 2' form a transverse partition of the connector module 1. The functional units 2, 2' are brought together with their narrow sides provided for this purpose. The fixing means or device 7 is then pushed or injected axially, i.e., in the mating direction SR, into the connector module 1 in order to connect the functional units 2, 2' in a way that ideally is detachable.

The functional units 2, 2' each have offsets 9 on their sides that are brought together, which offsets are oriented in a manner complementary to each other. As a result, the functional units 2, 2' do not shift axially relative to one another, even if no fixing means or device 7 is yet present. Thus, the functional units 2, 2' are stabilized during the further manufacturing process, for example in an injection mold.

Figure 3:
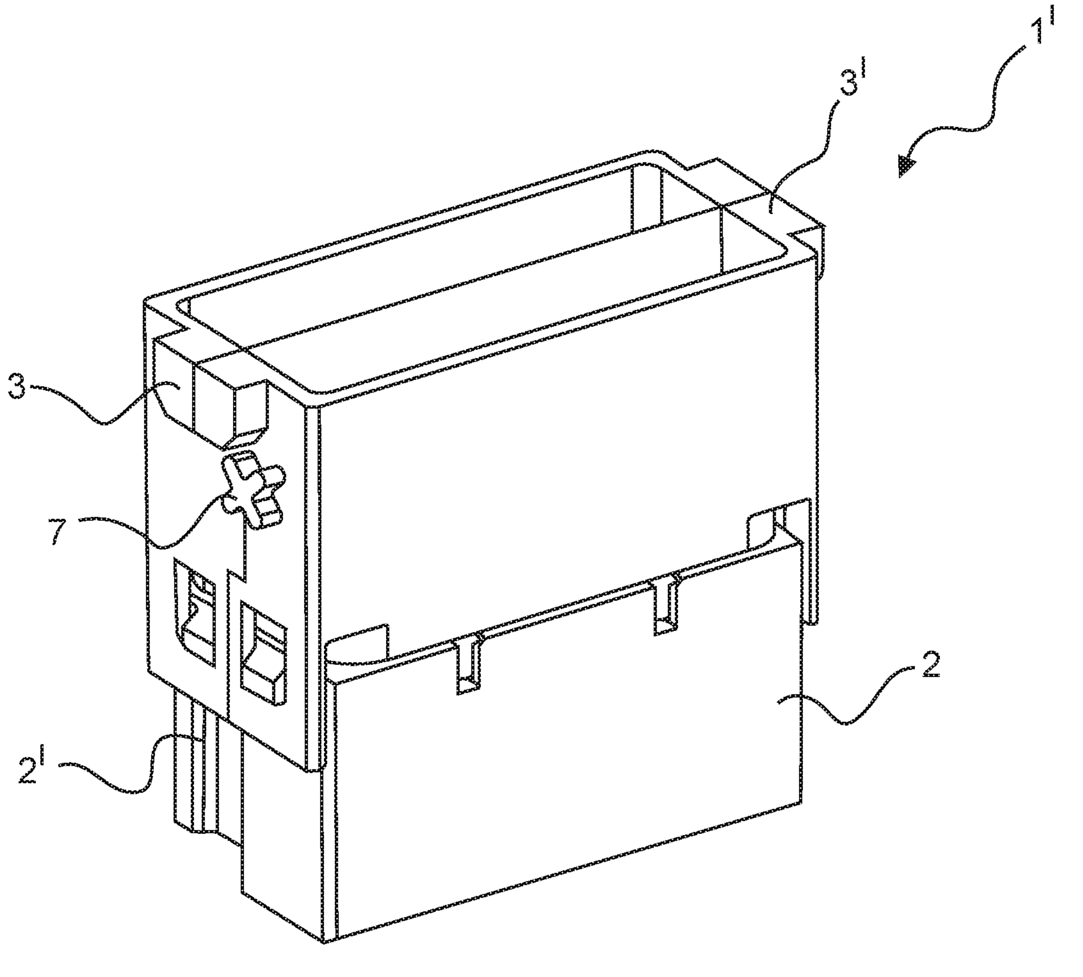
FIG. 3 shows a perspective illustration of a second exemplary embodiment of a connector module according to the invention.

FIG. 3 shows a second exemplary embodiment of a connector module 1' according to the invention. In this exemplary embodiment, the connector module 1' is longitudinally divided. Therefore, the fixing means or device 7 is pushed or injected into the narrow side of the connector module 1' perpendicularly to the mating direction SR. Such longitudinally divided connector modules 2, 2' have the disadvantage that the diameter of the contact elements that can be accommodated therein is limited. This also frequently gives rise to problems with clearance and creepage distances. One advantage of longitudinally dividing the connector modules, however, is that the functional units alone, i.e., without being connected to another functional unit, can be fastened in a holding frame if the slots of the holding frame are provided accordingly.

Figure 4:
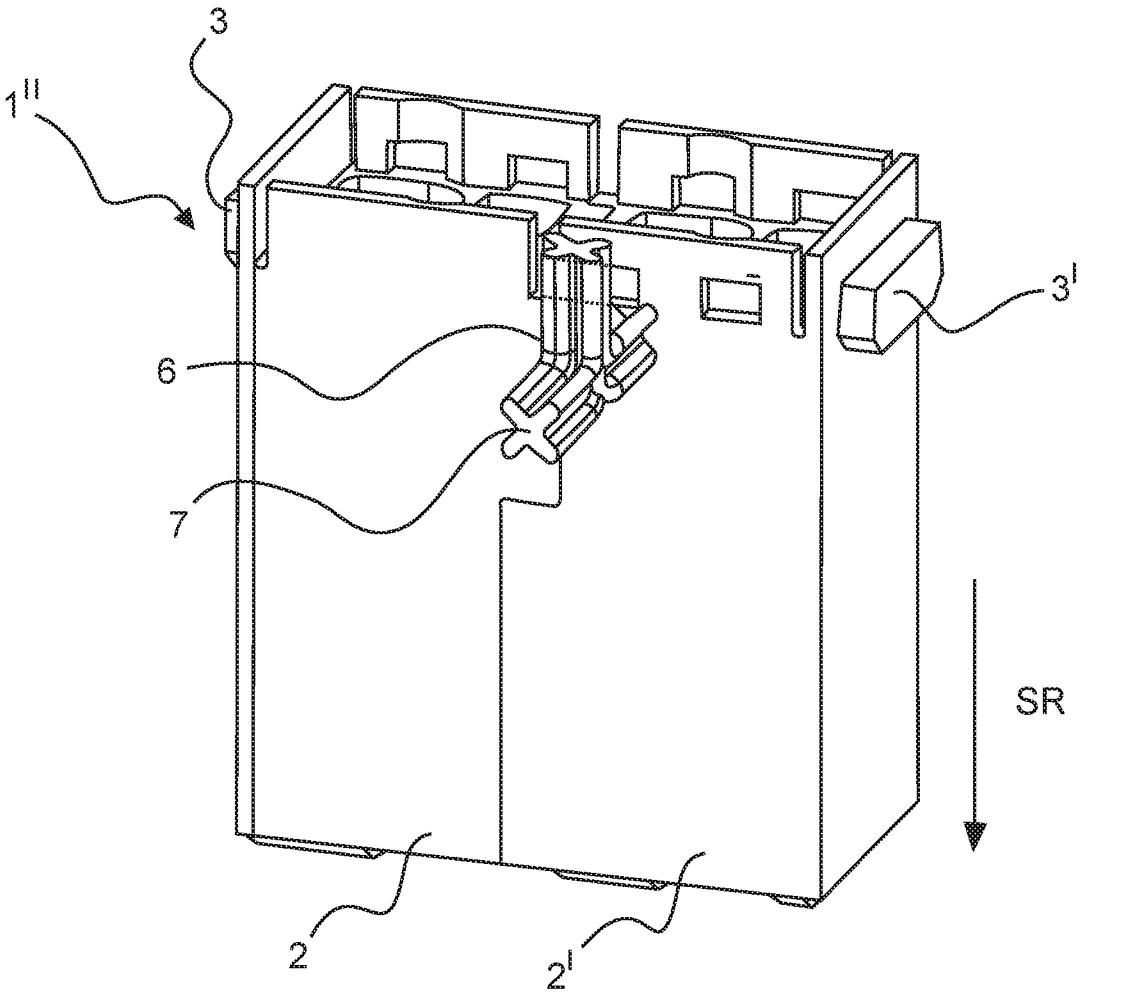
FIG. 4 shows a perspective and partially transparent illustration of a third exemplary embodiment of a connector module according to the invention.

A third exemplary embodiment of a connector module 1" according to the invention can be seen in FIG. 4. This variant again involves a previously mentioned transverse division of the connector module 1" by the functional units 2, 2' joined together on the narrow side. In this exemplary embodiment, the fixing means or device 7 extends within the connector module 1" both in the mating direction SR and perpendicularly thereto. The cavity 6 is of course designed accordingly. This design of the fixing means or device 7 ensures a particularly stable and play-free fixing of the functional units 2, 2' to one another. Of course, no finished component can be used as fixing means or device 7 for this purpose. In this exemplary embodiment, the fixing means or device 7 is injected into the cavity 6, in the form of curing material.

Figure 5:
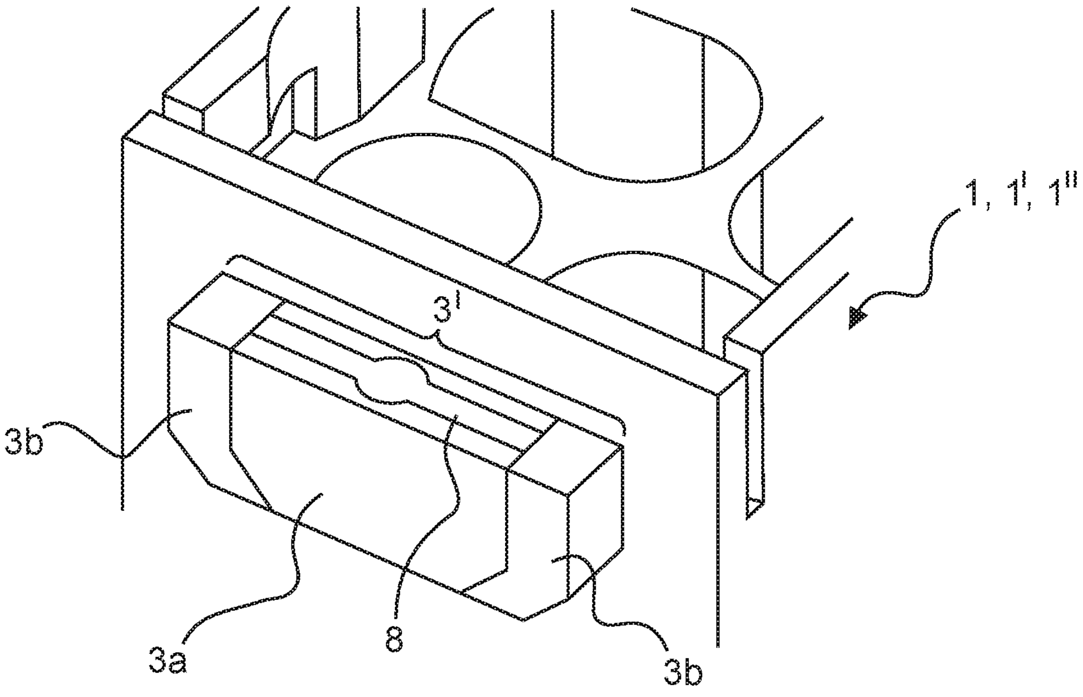
FIG. 5 shows a perspective detail of a connector module according to another exemplary embodiment of the invention.

FIG. 5 shows a detail of a connector module 1, 1', 1" according to other embodiments of the invention. The detail focuses on a holding means or devices 3' integrally formed on the various narrow sides of the connector module 1, 1', 1". In the previously shown exemplary embodiments, the holding means or devices 3' can (optionally) be embodied as described hereinafter in accordance with the illustration in FIG. 5. The holding means or devices 3' consists of a base **3*a* integrally formed on the functional unit 2, 2', which base has a groove 8. The base 3*a* corresponds substantially to a small holding means or device 3 (e.g., a small lug) of the connector module 1, 1', 1" and fits accordingly into a narrower recess of the previously mentioned holding frame. In an injection molding process, an enlargement 3*b* is injection-molded onto the base 3*a*. The base 3*a* together with the enlargement 3*b* corresponds to a larger holding means or device 3' (e.g., a large lug) of the connector module 1, 1', 1"** and fits accordingly into the larger recess of the previously mentioned holding frame. In this exemplary embodiment, the functional units can be swapped with each other as desired, since they are only provided with the useful polarization for the holding frame afterwards, in said injection-molding process.

Even though various aspects or features of the invention are shown in each case in combination in the figures, it is apparent to those skilled in the art—unless otherwise indicated—that the combinations shown and discussed are not the only possible ones. In particular, corresponding units or feature complexes from different exemplary embodiments can be interchanged. Accordingly, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A connector module for a modular industrial connector having a holding frame that is configured to receive and support the connector module along with one or more other connector modules, wherein the connector module is formed from at least two independent functional units of different form, wherein at least one of the independent functional units includes one or more contact element openings for receiving a respective contact element, wherein the functional units form a cavity with each other when in an assembled state to receive a fixing device to hold the functional units together in the assembled state apart from the holding frame, wherein the connector module is configured to couple to an opposing mating connector module in a mating direction aligned parallel with the one or more contact element openings, and wherein the functional units in the assembled state combine to form the connector module with protruding lugs on opposing lateral sides of the connector module to engage with corresponding recesses of the holding frame of the modular industrial connector.

2. The connector module as claimed in claim 1, wherein the cavity extends substantially in the mating direction of the connector module.

3. The connector module as claimed in claim 1, wherein the cavity extends substantially perpendicularly to the mating direction of the connector module.

4. The connector module as claimed in claim 1, wherein the connector module has the fixing device and the fixing device at least partially fills the cavity to fix the at least two functional units to one another.

5. The connector module as claimed in claim 4, wherein the fixing device is a component extruded into the space.

6. The connector module as claimed in claim 4, wherein the fixing device has a cross-shaped cross-section.

7. The connector module as claimed in claim 1, wherein the functional units each have an offset on a side thereof which are brought together, wherein the offsets are oriented in a manner complementary to each other.

8. A method for producing a connector module for a modular industrial connector having a holding frame that is configured to receive and support the connector module along with one or more other connector modules, the method comprising:

assembling at least two independent functional units of different form together in an assembled state, wherein the functional units enclose a cavity with each other when in the assembled state to receive a fixing device to hold the functional units together in the assembled state apart from the holding frame, wherein at least one of the independent functional units includes one or more contact element openings for receiving a respective contact element, wherein the connector module is configured to couple to an opposing mating connector module in a mating direction aligned parallel with the one or more contact element openings, and wherein the functional units in the assembled state combine to form the connector module with protruding lugs on opposing lateral sides of the connector module to engage with corresponding recesses of the holding frame of the modular industrial connector; and thereafter, at least partially filling the cavity with a fixing device, whereby the functional units are fixed to each other in the assembled state.

9. The method for producing a connector module for a modular industrial connector as claimed in claim 8, wherein the cavity is at least partially filled with the fixing device by inserting the fixing device into the cavity or by at least partially filling the cavity with a curing compound.

* * * * *